US012674038B2

(12) United States Patent
Ha

(10) Patent No.: US 12,674,038 B2
(45) Date of Patent: Jul. 7, 2026

(54) COMPOSITION AND METHOD FOR MICROBIAL CONTROL FOR USE WITH POLYMERS

(71) Applicant: MICROBAN PRODUCTS COMPANY, Huntersville, NC (US)

(72) Inventor: Mai Le Phuong Ha, Cornelius, NC (US)

(73) Assignee: MICROBAN PRODUCTS COMPANY, Huntersville, NC (US)

( * ) Notice: Subject to any disclaimer, the term of this patent is extended or adjusted under 35 U.S.C. 154(b) by 582 days.

(21) Appl. No.: 18/196,169

(22) Filed: May 11, 2023

(65) Prior Publication Data

US 2023/0383093 A1    Nov. 30, 2023

Related U.S. Application Data

(60) Provisional application No. 63/345,148, filed on May 24, 2022.

(51) Int. Cl.

| | |
|---|---|
| *C08K 5/05* | (2006.01) |
| *C08J 3/22* | (2006.01) |
| *C08K 5/09* | (2006.01) |
| *C08K 5/092* | (2006.01) |

(52) U.S. Cl.
CPC .................. *C08K 5/05* (2013.01); *C08J 3/22* (2013.01); *C08K 5/09* (2013.01); *C08K 5/092* (2013.01); *C08J 2300/00* (2013.01); *C08J 2300/22* (2013.01)

(58) Field of Classification Search
CPC ....................................................... C08K 5/05
See application file for complete search history.

(56) References Cited

U.S. PATENT DOCUMENTS

| | | | |
|---|---|---|---|
| 3,921,581 A | 11/1975 | Brewer | |
| 4,877,631 A | 10/1989 | Kaper et al. | |
| 5,526,771 A | 6/1996 | Ito | |
| 8,852,565 B2 | 10/2014 | Finke et al. | |
| 9,149,019 B2 | 10/2015 | Everhard | |
| 11,122,800 B2 | 9/2021 | Koehl et al. | |
| 12,378,388 B2 * | 8/2025 | Ha | C08J 3/226 |
| 12,479,974 B2 * | 11/2025 | Ha | A01P 1/00 |
| 2014/0271757 A1 | 9/2014 | Agrawal et al. | |
| 2016/0220728 A1 | 8/2016 | Adams et al. | |
| 2017/0304182 A1 | 10/2017 | Kadir et al. | |
| 2018/0118954 A1 | 5/2018 | Baries et al. | |
| 2019/0124921 A1 | 5/2019 | Koehl et al. | |
| 2020/0268624 A1 | 8/2020 | Hinrichs et al. | |
| 2020/0305426 A1 * | 10/2020 | Foster | A61K 45/06 |
| 2022/0041871 A1 | 2/2022 | Foster et al. | |
| 2023/0383093 A1 | 11/2023 | Ha | |

FOREIGN PATENT DOCUMENTS

| | | |
|---|---|---|
| BR | PI-1009652 B1 | 7/2020 |
| CN | 103461473 A | 12/2013 |
| CN | 105802165 A | 7/2016 |
| CN | 106473003 A | 3/2017 |
| CN | 106552183 A | 4/2017 |
| CN | 106562898 A | 4/2017 |
| CN | 107182808 A | 9/2017 |
| CN | 111849660 A | 10/2020 |
| WO | 98/14073 A2 | 4/1998 |
| WO | 01/87095 A1 | 11/2001 |
| WO | 2016084078 A1 | 6/2016 |
| WO | 2019/090105 A1 | 5/2019 |
| WO | 2020118240 A1 | 6/2020 |
| WO | 2021072473 A1 | 4/2021 |
| WO | 2021224317 A1 | 11/2021 |

OTHER PUBLICATIONS

Notice of Allowance for corresponding U.S. Appl. No. 18/072,960; issued on Jun. 9, 2025; 9 pages.
International Preliminary Report on Patentability (IPRP) for corresponding International Patent Application No. PCT/US2023/020786; mailed on Dec. 5, 2024; (11 pages).
Final Office Action (FOA) issued for U.S. Appl. No. 18/072,960; mailed on Jan. 28, 2025; 10 pages.
International Search Report and Written Opinion (ISR and WO) issued for PCT/US2022/051643 dated Apr. 4, 2023 (10 pages).
International Preliminary Report on Patentability (IPRP) issued for PCT International Application No. PCT/US2022/051643, mailed Jun. 20, 2024 (9 pages).
Non-Final Office Action (NFOA) issued for U.S. Appl. No. 18/073,105, mailed Feb. 25, 2025 (13 pages).
Internation Search Report (ISR) and Written Opinion for PCT Application No. PCT/US23/20786; Issued Oct. 13, 2023 (14 Pages).
Iinternation Search Report (ISR) and Written Opinion for PCT Application No. PCT/US22/51645 issued Apr. 5, 2023 (10 Pages).
Supplementary European Search Report (SESR) from European Patent Application No. 23812316.0; Oct. 15, 2025; 21 pages.
Surinder Kumar Yogeeta et al: "Attenuation of Abnormalities in the Lipid Metabolism during Experimental Myocardial Infarction Induced by Isoproterenol in Rats: Beneficial Effect of Ferulic Acid and Ascorbic Acid", Basic & Clinical Pharmacology & Toxicology, Nordic Pharmacological Society, Copenhagen, DK, vol. 98, No. 5, Apr. 19, 2006, pp. 467-472, XP072369603.
"TroyCare LSB3", Product Data, Apr. 24, 2018, pp. 1-3, XP093310322.
Huang Tianqi et al: "Polymeric Antimicrobial Food Packaging and Its Applications", Polymers, vol. 11, No. 3, Mar. 25, 2019, p. 560, XP055809709.
Richards R. M.E. et al: "Effect of 3-Phenylpropan-1-ol, 2-Phenylethanol, and Benzyl Alcohol on Pseudomonas aeruginosa", Journal of Pharmaceutical Sciences, vol. 62, No. 4, Apr. 1, 1973, pp. 585-587, XP093310974.
Richards R M E et al: "Enhancement of Benzalkonium Chloride and Chlorhexidine Acetate Activity against Pseudomonas aeruginosa by Aromatic Alcohols", Journal of Pharmaceutical Sciences, Elsevier Inc, vol. 62, No. 12 Dec. 1, 1973, pp. 2035-2037, XP009528763.

* cited by examiner

*Primary Examiner* — Michael F Pepitone
(74) *Attorney, Agent, or Firm* — Jason A. Smith; Shumaker, Loop & Kendrick, LLP

(57) ABSTRACT

A composition having an additive or component having an antimicrobial or a preservative property, and 3-phenylpropanol or a member of the phenylpropanoid family is provided. A composition having a polymer, an organic acid, and 3-phenylpropanol or a member of the phenylpropanoid family is provided as well as a method(s) of using.

14 Claims, No Drawings

COMPOSITION AND METHOD FOR MICROBIAL CONTROL FOR USE WITH POLYMERS

CROSS-REFERENCE TO RELATED APPLICATIONS

This application claims priority from U.S. Provisional Patent Application No. 63/345,148, filed on May 24, 2022, in the United States Patent and Trademark Office. The disclosure of which is incorporated herein by reference in its entirety.

TECHNICAL FIELD

The invention relates to a method and a composition for microbial control for use with polymers, more particularly to a method and a composition using an additive or component having an antimicrobial or preservative property for microbial control for use with polymers.

BACKGROUND

High-performance thermoplastics are often used in applications requiring high strength, durability, dimensional stability, and low friction.

Acetal, also known as polyoxymethylene (POM), is a high-performance thermoplastic. It has a high melting point and is susceptible to oxidation and acid hydrolysis. It is a common practice to molder to use pellet masterbatches of color, or other additives at a few percentages to create products with different colors and/or physical properties from the same base resin. However, many high performance thermoplastics such as acetals are sensitive to acids and use of acidic additives could cause depolymerization.

Thus, there is a need for an alternative composition and method for use with high performance thermoplastics that provides microbial control yet overcomes such known processing problems and disadvantages.

SUMMARY

The present invention relates to a composition and method for microbial control for use with polymers.

In an embodiment of the invention, a composition comprising an additive or component having an antimicrobial or a preservative property, and 3-phenylpropanol or a member of the phenylpropanoid family is provided.

The additive or component having the antimicrobial or the preservative property is Generally-Recognized-as-Safe (GRAS). The Generally-Recognized-as-Safe (GRAS) additive or component may be selected from the group consisting of a minimum risk pesticide, a food preservative, and a combination thereof. The food preservative may be an organic acid. The organic acid can be selected from the group consisting of benzoic acid, propionic acid, sorbic acid, citric acid, lactic acid, ascorbic acid, acetic acid, erythorbic acid, fumaric acid, malic acid, glycolic acid, derivatives thereof and a combination thereof. The organic acid may preferably be selected from the group consisting of benzoic acid, sorbic acid, citric acid, and a combination thereof. The member of the phenylpropanoid family is selected from the group consisting of a derivative of phenyl propane, a derivative of phenyl propene, and a combination thereof. The organic acid and the 3-phenylpropanol or a member of the phenylpropanoid family are present in a ratio of the organic acid to the 3-phenylpropanol or a member of the phenylpropanoid family in a range from 1:100 to 100:1, preferably in a range from 1:10 to 10:1.

In an embodiment of the invention, a composition comprising a polymer, an organic acid, and 3-phenylpropanol or a member of the phenylpropanoid family is provided.

The thermoplastic polymer may be selected from the group consisting of polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM), nylon, polyacrylic, polyester, methyl methacrylate-acrylonitrile-butadiene-styrene (MABS), and a combination thereof. The thermoplastic polymer is preferably polyoxymethylene (POM).

In an embodiment of the invention, a method of use comprising adding 3-phenylpropanol or a member of the phenylpropanoid family into a thermoplastic polymer thereby reducing the processing temperature of the thermoplastic polymer is provided.

In an embodiment of the invention, a method of use comprising compounding an organic acid and 3-phenylpropanol or a member of the phenylpropanoid family with a thermoplastic polymer to form a compounded material is provided.

The compounded material may be in a form of a masterbatch. The method may further comprise using the masterbatch to mold an article having an antimicrobial effect.

In certain aspects disclosed is an additive, antimicrobial composition configured to be added to a polymer, the composition includes a component present in the additive, antimicrobial composition at an effective amount to exhibit an antimicrobial property in the polymer and optionally exhibiting a preservative property in the polymer, and 3-phenylpropanol or a member of the phenylpropanoid family, wherein the component and 3-phenylpropanol or a member of the phenylpropanoid family are present in the additive antimicrobial composition at a ratio of 5:1 to 1:5 relative to one another. In certain aspects, the antimicrobial effect includes prolonged (e.g., months or years) and/or permanent reduction in and/or prevention of growth of gram positive bacteria, gram negative bacteria, or a combination thereof within and/or on the surface of the polymer both within the additive disclosed herein as well as the end-use articles produced therefrom (e.g., injection molded articles including the additive therein). In certain aspects, the component (e.g., organic acid and more particularly benzoic acid) and/or the 3-phenylpropanol or a member of the phenylpropanoid family are homogeneously dispersed in the additive, antimicrobial composition, which may be used as a masterbatch composition. Moreover, in certain aspects, the additive, antimicrobial compositions (and more particularly the component (e.g., organic acid and more particularly benzoic acid) and/or the 3-phenylpropanol or a member of the phenylpropanoid family are configured to homogeneously disperse within an article when forming the article (e.g., injection molding a polymer including the materbatch therein).

In certain aspects, the component further comprises a preservative property and is Generally-Recognized-as-Safe (GRAS). In certain aspects, component is selected from the group consisting of a minimum risk pesticide, a food preservative, and a combination thereof. In certain aspects, component is an organic acid is selected from the group consisting of benzoic acid, sorbic acid, citric acid, ascorbic acid, erythorbic acid, fumaric acid, glycolic acid, derivatives thereof and a combination thereof.

In certain aspects, the component is benzoic acid is present in the additive, antimicrobial composition at a concentration ranging from 500 ppm to 3500 ppm of the overall amount of the composition.

In certain aspects, 3-phenylproponal is present in the additive, antimicrobial composition at a concentration ranging from 500 ppm to 3500 ppm of the overall amount of the composition.

In certain aspects, the benzoic acid and 3-phenylpropanol are present in the additive, antimicrobial composition at a ratio ranging from 2:1 to 1:2 relative to one another.

In certain aspects, the additive, antimicrobial composition is configured to lower polymer melting temperature of the polymer between 5.6° C. to 16.7° C. (10° F. to 30° F.).

In certain aspects, the member of the phenylpropanoid family is present and is selected from the group consisting of a derivative of phenyl propane, a derivative of phenyl propene, and a combination thereof.

In certain aspects, the component and the 3-phenylpropanol or a member of the phenylpropanoid family are present in the additive at a ratio of the organic acid to the 3-phenylpropanol or a member of the phenylpropanoid family in a range from 1:1 relative to one another.

Also disclosed herein is composition including: a polymer, an organic acid present in the composition at an effective amount to exhibit an antimicrobial property in the composition, and 3-phenylpropanol or a member of the phenylpropanoid family at an effective amount to reduce and/or prevent oxidation and acid hydrolysis of the polymer by the organic acid, wherein the organic acid and 3-phenylpropanol or a member of the phenylpropanoid family are present in the composition at a ratio of 10:1 to 1:10. In certain aspects, the antimicrobial property/effect includes prolonged (e.g., months or years) and/or permanent reduction in and/or prevention of growth of gram positive bacteria, gram negative bacteria, or a combination thereof within and/or on the surface of the polymer within the compositions disclosed herein (e.g., additives and/or masterbatches and end-use articles including portions of the masterbatch therein).

In certain aspects, the composition is in a form of a masterbatch having: (i) the polymer present at a concentration ranging from 60% (600,000 ppm) to 97% (970,000 ppm) of an overall amount of the composition; (ii) the organic acid present at a concentration ranging from 1.5% (15,000 ppm) to 20% (200,000 ppm) or 2.0% (20,000 ppm) to 15% (150,000 ppm) or 2.5% (25,000 ppm) to 10% (100,000 ppm) or 2.5 (25,000 ppm) to 7.5% (75,000 ppm) of an overall amount of the composition; and (iii) the 3-phenylpropanol or a member of the phenylpropanoid family present at a concentration ranging from 1.5% (15,000 ppm) to 20% (200,000 ppm) or 2.0% (20,000 ppm) to 15% (150,000 ppm) or 2.5% (25,000 ppm) to 10% (100,000 ppm) or 2.5 (25,000 ppm) to 7.5% (75,000 ppm) of an overall amount of the composition.

In certain aspects, the organic acid in the composition is selected from the group consisting of benzoic acid, sorbic acid, citric acid, ascorbic acid, erythorbic acid, fumaric acid, glycolic acid, derivatives thereof and a combination thereof.

In certain aspects, the organic acid in the composition comprises benzoic acid at a concentration ranging from 500 ppm to 3500 ppm of an overall amount of the composition.

In certain aspects, the 3-phenylpropanol is present in the composition at a concentration ranging from 500 ppm to 3500 ppm of an overall amount of the composition In certain aspects, the benzoic acid and 3-phenylpropanol are present in the composition at a ratio ranging from 2:1 to 1:2.

In certain aspects, 3-phenylpropanol is present in the composition at an effective amount to lower polymer melting temperature of the polymer between 5.6° C. to 16.7° C. (10° F. to 30° F.).

In certain aspects, the polymer is a thermoplastic polymer that is selected from the group consisting of polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM), nylon, polyacrylic, polyester, methyl methacrylate-acrylonitrile-butadiene-styrene (MABS), and a combination thereof.

In certain aspects, also disclosed is a method of making the composition by adding the organic acid into the polymer and adding 3-phenylpropanol or a member of the phenylpropanoid family at an effective amount into the polymer thereby reducing a processing temperature of the polymer and at an effective amount to reduce and/or prevent oxidation and acid hydrolysis of the polymer by the organic acid, the polymer is a thermoplastic polymer.

In certain aspects, the method includes making a compounded material is in a form of a masterbatch.

In certain aspects, the method further includes using the masterbatch to produce an article having an antimicrobial effect.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DETAILED DESCRIPTION

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

The present invention is a composition and a method for microbial control for use with polymers. The composition exhibits an antimicrobial property. In certain aspects, the antimicrobial property and/or antimicrobial effect includes prolonged (e.g., months or years) and/or permanent reduction in and/or prevention of growth of gram positive bacteria, gram negative bacteria, or a combination thereof within and/or on the surface of the polymer both within the additive disclosed herein as well as the end-use articles produced therefrom (e.g., injection molded articles including the additive/portions of the masterbatch therein).

In an embodiment of the invention, the composition comprises an additive or component having an antimicrobial or preservative property, more particularly a Generally-Recognized-as-Safe (GRAS) additive or component, and 3-phenylpropanol or a member of the phenylpropanoid family.

Examples of a GRAS additive or component include, but are not limited to, a minimum risk pesticide, a food preservative, among others.

In an embodiment of the present invention, the food preservative is an organic acid. Examples of organic acids include, but are not limited to, benzoic acid, sorbic acid, citric acid, ascorbic acid, erythorbic acid, fumaric acid, glycolic acid, derivatives thereof and a combination thereof. Preferred organic acids include, but are not limited to, benzoic acid, sorbic acid, citric acid, and a combination thereof. In certain preferred aspects, benzoic acid (i.e., a solid organic acid in crystalline form) is the preferred organic acid due to its reduced water solubility when compared to other, more water soluble acids such as propionic acid, acetic acid, malic acid, or lactic acid. Benzoic acid is preferred because it is easy to process and admix with, for example, the thermoplastic polymers disclosed herein. Moreover, benzoic acid tends to exhibit less hygroscopicity than other acids when admixed with, for example, the disclosed thermoplastic polymers. Without wishing to be bound by theory and when using the disclosed thermoplastic polymers, more water soluble acids (e.g., propionic acid, acetic acid, malic acid, or lactic acid) should generally be avoided due to their hygroscopic nature, which leads to issues such as potential depolymerization of the polymers disclosed herein (e.g., acid hydrolysis) during polymer processing (e.g., admixing the acid with the polymer, during injection molding, etc.) and/or increased defects in the end product due to water absorption.

The phenylpropanoid family of 3-phenylpropanol may include, but is not limited to, a derivative of phenyl propane, a derivative of phenyl propene, and a combination thereof. It is noted that 3-phenylpropanol and the phenylpropanoid family are organic compounds.

In an aspect of the invention, the organic acid and the 3-phenylpropanol (or a member of the phenylpropanoid family) are present in a ratio of organic acid to 3-phenylpropanol (or a member of the phenylpropanoid family) in a range from 1:100 to 100:1, 1:75 to 75:1, 1:50 to 50:1, 25:1 to 1:25, 1:15 to 15:1, 1:10 to 10:1, 1:5 to 5:1, 3:1 to 1:3, 2:1 to 1:2, 1.5:1 to 1:1.5, or 1:1 relative to one another. In certain aspects and when included within and/or admixed with the thermoplastic polymers disclosed below, the organic acid is present at 500 ppm to 3500 ppm, more preferably at 1000 ppm to 3500 ppm, and most preferably at 1000 ppm to 2500 ppm and include the above disclosed ratios of organic acid to 3-phenylpropanol (or a member of the phenylpropanoid family). Likewise and included within and/or admixed with the thermoplastic polymers along with the organic acid(s) disclosed herein, the 3-phenylpropanol (or a member of the phenylpropanoid family) is present at 500 ppm to 3500 ppm, more preferably at 1000 ppm to 3500 ppm, and most preferably at 1000 ppm to 2500 ppm and include the above disclosed ratios of organic acid to 3-phenylpropanol (or a member of the phenylpropanoid family).

In an embodiment of the invention, the composition comprises a polymer, an organic acid, and 3-phenylpropanol (also known as 3-phenyl-1-propanol) or a member of the phenylpropanoid family.

The polymer is preferably a thermoplastic polymer. Examples of thermoplastic polymers include, but are not limited to, polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM) (also referred to as acetal), nylon, polyacrylic, polyester, methyl methacrylate-acrylonitrile-butadiene-styrene (MABS), and a combination thereof.

It has unexpectedly been found that there is a synergistic antimicrobial effect between a GRAS antimicrobial/preservative and 3-phenylpropanol. The synergistic effect allows the use of the antimicrobial at lower levels and in materials (e.g., masterbatches and end-use articles) that otherwise are not feasible.

Experiments were done with benzoic acid and 3-phenylpropanol. However, a synergistic effect may also occur between the extended phenylpropanoid family of 3-phenylpropanol and benzoic acid as well as with other GRAS acid antimicrobials such as citric acid, sorbic acid, and a combination thereof.

In an aspect of the invention, benzoic acid (GBA) and 3-phenylpropanol (or a member of the phenylpropanoid family) are present in a ratio of benzoic acid (GBA) to 3-phenylpropanol (or a member of the phenylpropanoid family) in a range from 1:100 to 100:1, :75 to 75:1, 1:50 to 50:1, 25:1 to 1:25, 1:15 to 15:1, 1:10 to 10:1, 1:5 to 5:1, 3:1 to 1:3, 2:1 to 1:2, 1.5:1 to 1:1.5, or a 1:1. In certain aspects, the organic acid is benzoic acid, and the ratio of benzoic acid to 3-phenylpropanol (or a member of the phenylpropanoid family) ranges from 1:100 to 100:1, 1:75 to 75:1, 1:50 to 50:1, 25:1 to 1:25, 1:15 to 15:1, 1:10 to 10:1, 1:5 to 5:1, 3:1 to 1:3, 2:1 to 1:2, 1.5:1 to 1:1.5, or 1:1 relative to one another. In certain aspects, the preferred ratio of benzoic acid to 3-phenylpropanol (or a member of the phenylpropanoid family) ranges from 1:5 to 1:5. In more preferred aspects, the ratio of benzoid acid to 3-phenylpropanol (or a member of the phenylpropanoid family) ranges from 3:1 to 1:3. In most preferred aspects, the ratio of benzoic acid to 3-phenylpropanol (or a member of the phenylpropanoid family) ranges from 2:1 to 1:2 and/or 1:1. In certain aspects and when included within and/or admixed with the thermoplastic polymers disclosed below, benzoic acid is present at 500 ppm to 3500 ppm, more preferably at 1000 ppm to 2700 ppm, and most preferably at 1950 ppm to 2500 ppm and include the above disclosed ratios of benzoic acid to 3-phenylpropanol (or a member of the phenylpropanoid family. Likewise and included within and/or admixed with the thermoplastic polymers along with the benzoic acid disclosed herein, the 3-phenylpropanol (or a member of the phenylpropanoid family) is present at 500 ppm to 3500 ppm, more preferably at 1000 ppm to 2700 ppm, and most preferably at 1950 ppm to 2500 ppm and include the above disclosed ratios of benzoic acid to 3-phenylpropanol (or a member of the phenylpropanoid family. In an embodiment of the invention, a method of using is provided. The method comprises adding 3-phenylpropanol or a member of the phenylpropanoid family into a thermoplastic polymer thereby reducing a processing temperature of the thermoplastic polymer. In certain aspects, the processing/melt temperature is lowered between 5.6° C. to 16.7° C. (10° F. to 30° F.), and is concentration dependent on the amount of 3-phenylpropanol or a member of the phenylpropanoid family added to the polymer. In this aspect, lowering the temperature beyond a 30° F. reduction may negatively impact the physical properties (e.g., flowability) of the polymer rendering the polymer unsatisfactory for end use (e.g., injection molding, etc.).

It has unexpectedly been found that 3-phenylpropanol aids in lowering the melt temperature of the polymers disclosed herein, which further results in various observed synergistic advantages when the 3-phenylpropanol or a member of the phenylpropanoid family is mixed with the disclosed polymers and GRAS additives/acids (more specifically benzoic acid). In particular, 3-phenylpropanol acts as a plasticizer and/or similar to a plasticizer between the polymer chains, allowing the polymer chains to slip past each other at lower temperatures which further allows for easier processing of the polymer at lower temperatures. Moreover, the GRAS additives (e.g., benzoic acid) disclosed herein are temperature sensitive, and thus, the lowered melt temperatures observed when using 3-phenylpropanol or a member of the phenylpropanoid family in combination with the polymer further reduces and/or avoids GRAS additives (e.g., benzoic acid) degradation and further avoids the GRAS additives being included with the polymer at excessive concentrations/amounts. Thus, the when using 3-phenylpropanol or a member of the phenylpropanoid family in combination with the disclosed polymers and GRAS additives (e.g., benzoic acid), lower amounts/concentrations of GRAS additives (e.g., benzoic acid) may be used that advantageously exhibit antimicrobial effects (often observed at much higher concentrations) while concurrently and advantageously avoiding and/or minimizing various above discussed problems (e.g., acid hydrolysis and/or defects in the end product due to water absorption).

Without wishing to be bound by theory, it is hypothesized that the —OH group in 3-phenylpropanol forms a pseudo ester bond with the acid groups (e.g., in benzoic acid and/or the other organic acids disclosed herein) that in turn creates a more temperature stable molecule. In the case of acetal, it is believed that the formation of the pseudo ester advantageously mitigates the acidic effect of the GRAS additive/ acid (e.g., benzoic acid) on acetal. In particular, acetal polymer is highly sensitive to acidic degradation, and once the polymer chain is ruptured, highly toxic formaldehyde and acetic acid is created. Thus, by combining 3-phenylpropanol with, for example, the disclosed GRAS additives/acid (and more specifically benzoic acid) with acetal, much lower concentrations of the GRAS additives/acid (and more specifically benzoic acid) may be used thereby avoiding the above-mentioned acidic degradation the disclosed polymers and GRAS additives (e.g., benzoic acid), lower amounts/concentrations of GRAS additives (e.g., benzoic acid) may be used that advantageously exhibit antimicrobial effects (often observed at much higher concentrations).

In an embodiment of the invention, a method of using is provided. In particular, the compositions disclosed herein may be used to form masterbatches. In this instance, a masterbatch includes at least one of the polymers disclosed above and includes the disclosed component (e.g., an organic acid and more particularly benzoic acid) and 3-phenylpropanol or a member of the phenylpropanoid family homogeneously dispersed in the polymer at concentrations ranging from 5 to 30 wt % of the masterbatch (i.e., the component ranging from 2.5 to 15 wt % and 3-phenylpropanol or a member of the phenylpropanoid family ranging from 2.5 to 15 wt % with the polymer and other ingredients comprising the remaining concentration(s)). For some polymers, such as acetal, compounding high levels of organic acids (e.g., benzoic acid) cannot be accomplished due to the sensitivity of acetal to acidic degradation (e.g., acid hydrolysis and oxidation), but the addition of 3-phenylpropanol mitigates the processing issue and makes the master batch processing feasible.

The masterbatch may be further combined with a compatible polymer during, for example, injection molding and the component (e.g., an organic acid and more particularly benzoic acid) and 3-phenylpropanol or a member of the phenylpropanoid family and homogeneously dispersed within the compatible polymer during the molding process to mold an article having a resulting prolonged and/or permanent antimicrobial effect. In certain aspects, both the component (e.g., an organic acid and more particularly benzoic acid) and 3-phenylpropanol or a member of the phenylpropanoid family are present in the article at a concentration ranging from 0.05 wt % to 0.5 wt %, to achieved the desired, prolonged (and/or permanent) antimicrobial effect/property (i.e., prolonged and/or permanent reduction and/or prevention of bacterial and/or microbial growth).

WORKING EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for.

Example 1

TABLE 1

Antimicrobial efficacy of TPU with GBA against *Escherichia coli* (gram-negative bacteria) using ISO22196 test method.

| Sample descriptions | Viable organisms *Escherichia coli* | Average log reduction |
|---|---|---|
| TPU control, replicate 1 | 110,000 | — |
| TPU control, replicate 2 | 150,000 | |
| TPU control, replicate 3 | 130,000 | |
| TPU with 4500 ppm GBA, replicate 1 | 36,000 | 0.9 |
| TPU with 4500 ppm GBA, replicate 2 | 16,000 | |
| TPU with 4500 ppm GBA, replicate 3 | 8,300 | |
| TPU with 5250 ppm GBA, replicate 1 | 33,000 | 1.7 |
| TPU with 5250 ppm GBA, replicate 2 | 4,500 | |
| TPU with 5250 ppm GBA, replicate 3 | <100 | |
| TPU with 6000 ppm GBA, replicate 1 | 4,500 | 2.6 |
| TPU with 6000 ppm GBA, replicate 2 | <100 | |
| TPU with 6000 ppm GBA, replicate 3 | <100 | |

As demonstrated in Table 1, GBA only exhibited consistent antimicrobial efficacy (>1 log reduction) against *E. coli.* at 5250 ppm level in TPU.

3-phenylpropanol is generally not known to be an antimicrobial agent but as shown in the Table 2 immediately below, and in view of Table 1, 3-phenylpropanol when combined with GBA synergistically increases the log reduction of *Escherichia coli* at much lower GBA concentrations than those used in Table 1.

TABLE 2

Antimicrobial efficacy of TPU with GBA and 3-phenyl propanol against *Escherichia coli* (gram-negative bacteria) using ISO22196 test method.

| Sample descriptions | Viable organisms *Escherichia coli* | Average log reduction |
|---|---|---|
| TPU control, replicate 1 | 2,100,000 | — |
| TPU control, replicate 2 | 680,000 | |
| TPU control, replicate 3 | 1,500,000 | |
| TPU with 2500 ppm GBA, replicate 1 | 4,900,000 | No reduction |
| TPU with 2500 ppm GBA, replicate 2 | 2,100,000 | |
| TPU with 2500 ppm GBA, replicate 3 | 2,100,000 | |
| TPU with 2000 ppm GBA + 2000 ppm 3-phenyl propanol, replicate 1 | 93,000 | 1.3 |
| TPU with 2000 ppm GBA + 2000 ppm 3-phenyl propanol, replicate 2 | 40,000 | |
| TPU with 2000 ppm GBA + 2000 ppm 3-phenyl propanol, replicate 3 | 93,000 | |
| TPU with 2500 ppm GBA + 2000 ppm 3-phenyl propanol, replicate 1 | 51,000 | 1.4 |
| TPU with 2500 ppm GBA + 2000 ppm 3-phenyl propanol, replicate 2 | 57,000 | |
| TPU with 2500 ppm GBA + 2000 ppm 3-phenyl propanol, replicate 3 | 57,000 | |

As seen in Table 2, at 2500 ppm GBA, no efficacy against *E. coli* was observed. However, when 3-phenyl propanol was added to the material, bringing the total additive to 4500 ppm combined, the log reduction was 1.4, more than 4500 ppm GBA alone (less than 1). This demonstrates the synergetic effect of GBA and 3-phenyl propanol in TPU.

TABLE 3

Antimicrobial efficacy of TPU with GBA and 3-phenyl propanol against *Staphylococcus aureus* (gram-positive bacteria) using ISO22196 test method.

| Sample descriptions | Viable organisms *Staphylococcus aureus* | Average log reduction |
|---|---|---|
| TPU control, replicate 1 | 1,100,000 | — |
| TPU control, replicate 2 | 780,000 | |
| TPU control, replicate 3 | 780,000 | |
| TPU with 2500 ppm GBA, replicate 1 | 2,100,000 | No reduction |
| TPU with 2500 ppm GBA, replicate 2 | 1,700,000 | |
| TPU with 2500 ppm GBA, replicate 3 | 4,900,000 | |
| TPU with 2000 ppm GBA + 2000 ppm 3-phenyl propanol, replicate 1 | 200 | 2.5 |
| TPU with 2000 ppm GBA + 2000 ppm 3-phenyl propanol, replicate 2 | 17,000 | |
| TPU with 2000 ppm GBA + 2000 ppm 3-phenyl propanol, replicate 3 | 4,500 | |
| TPU with 2500 ppm GBA + 2000 ppm 3-phenyl propanol, replicate 1 | <100 | 3.9 |
| TPU with 2500 ppm GBA + 2000 ppm 3-phenyl propanol, replicate 2 | <100 | |
| TPU with 2500 ppm GBA + 2000 ppm 3-phenyl propanol, replicate 3 | <100 | |

Table 3 in view of Tables 1 and 2 further demonstrates that in TPU, GBA alone did not exhibit antimicrobial efficacy at more than 4500 ppm while the combination of 3-phenyl propanol and GBA at 4,000 ppm did. This demonstrates the synergetic effect of GBA and 3-phenyl propanol in TPU.

Example 2

(1) Masterbatch compounding:

GBA and 3-phenylpropanol were compounded into acetal at 1:1 ratio, 5 weight % each, wherein the weight percentages are based on the total weight of the GBA, 3-phenylpropanol and polymer.

3-phenylpropanol was found to lower the processing temperature and helped stabilize the process. It is impossible to compound GBA into acetal above 5 weight %.

(2) The masterbatch was used at 2.5% at a molder to make products with final level of GBA and 3-phenylpropanol at 1250 ppm.

TABLE 4

Antimicrobial efficacy of GBA and 3-phenylpropanol combination against *Escherichia coli* (Gram-negative bacteria) in acetal using ISO22196 test method. This demonstrates the synergistic effect of GBA and 3-phenyl propanol in acetal.

| Sample descriptions | Viable organisms *Escherichia coli* |
|---|---|
| Acetal control, replicate 1 | >4,900,000 |
| Acetal with 1250 ppm GBA and 1250 ppm 3-phenylpropanol, replicate 1 | <100 |
| Acetal with 1250 ppm GBA and 1250 ppm 3-phenylpropanol, replicate 2 | <100 |
| Acetal with 1250 ppm GBA and 1250 ppm 3-phenylpropanol, replicate 3 | <100 |

TABLE 5

Antimicrobial efficacy of GBA and 3-phenylpropanol combination
against *Staphylococcus aureus* (Gram-positive bacteria)
in acetal using ISO22196 test method.

| Sample descriptions | Viable organisms *Staphylococcus aureus* |
|---|---|
| Acetal control, replicate 1 | 1500000 |
| Acetal with 1250 ppm GBA and 1250 ppm 3-phenylpropanol, replicate 1 | <100 |
| Acetal with 1250 ppm GBA and 1250 ppm 3-phenylpropanol, replicate 2 | <100 |
| Acetal with 1250 ppm GBA and 1250 ppm 3-phenylpropanol, replicate 3 | 8000 |

TABLE 7

Antimicrobial efficacy of GBA and 3-phenylpropanol combination
against *Staphylococcus aureus* (Gram-positive bacteria)
in acetal using ISO22196 test method.

| Sample descriptions | Viable organisms *Staphylococcus aureus* |
|---|---|
| Acetal control, average | 621,000 |
| Acetal with 500 ppm GBA and 500 ppm 3-phenylpropanol, replicate 1 | <100 |
| Acetal with 500 ppm GBA and 500 ppm 3-phenylpropanol, replicate 2 | <100 |

TABLE 8

Antimicrobial efficacy of 3-phenylpropanol alone
against *Escherichia coli* (Gram-negative bacteria)
in acetal using ISO22196 test method.

| Sample descriptions | Viable organisms *Escherichia coli* |
|---|---|
| Acetal control, avergae | 4,900,000 |
| Acetal with 2500 ppm GBA, replicate 1 | 4,900,000 |
| Acetal with 2500 ppm GBA, replicate 2 | 2,1000,000 |

TABLE 6

Antimicrobial efficacy of GBA and 3-phenylpropanol combination
against *Escherichia coli* (Gram-negative bacteria) in acetal
using ISO22196 test method. This demonstrates the synergistic
effect of GBA and 3-phenyl propanol in acetal.

| Sample descriptions | Viable organisms *Escherichia coli* |
|---|---|
| Acetal control, average | >4,900,000 |
| Acetal with 500 ppm GBA and 500 ppm 3-phenylpropanol, replicate 1 | 15,000 |
| Acetal with 500 ppm GBA and 500 ppm 3-phenylpropanol, replicate 2 | <100 |
| Acetal with 500 ppm GBA and 500 ppm 3-phenylpropanol, replicate 3 | <100 |

As stated above, 3-phenylpropanol is generally not known to be an antimicrobial. Minimum inhibitory concentration (MIC) of 3-phenylpropanol is 4000 ppm against *Staphylococcus aureus* and 3000-4000 ppm against *Escherichia coli*.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A composition comprising:
   (i) a polymer present at a concentration ranging from 70 to 95% of an overall amount of the composition,
   (ii) an organic acid present at a concentration ranging from 2.5% to 10% of an overall amount of the composition, and
   (iii) 3-phenylpropanol or a member of a phenylpropanoid family present at a concentration ranging from 2.5% to 10% of an overall amount of the composition.

2. The composition according to claim 1, wherein the organic acid is selected from the group consisting of benzoic acid, sorbic acid, citric acid, ascorbic acid, erythorbic acid, fumaric acid, and glycolic acid.

3. The composition according to claim 1, wherein the organic acid comprises benzoic acid at a concentration ranging from 500 ppm to 3500 ppm of an overall amount of the composition.

4. The composition according to claim 3, wherein the 3-phenylpropanol is present in the composition at a concentration ranging from 500 ppm to 3500 ppm of an overall amount of the composition.

5. The composition according to claim 4, wherein the benzoic acid and 3-phenylpropanol are present in the composition at a ratio ranging from 2:1 to 1:2.

6. The composition according to claim 5, wherein 3-phenylpropanol is present in the composition at an effective amount to lower polymer melting temperature of the polymer between 5.6° C. to 16.7° C. (10° F. to 30° F.).

7. The composition according to claim 1, wherein the polymer is a thermoplastic polymer is selected from the group consisting of polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM), nylon, polyacrylic, polyester, methyl methacrylate-acrylonitrile-butadiene-styrene (MABS), and a combination thereof.

8. A method of making the composition of claim 1 comprising:
   adding the organic acid into the polymer and
   adding 3-phenylpropanol or a member of the phenylpropanoid family at an effective amount into the polymer to form a compounded material, thereby reducing a processing temperature of the polymer and at an effective amount to reduce and/or prevent oxidation and acid hydrolysis of the polymer by the organic acid, the polymer is a thermoplastic polymer.

9. The method according to claim 8, wherein the thermoplastic polymer is selected from the group consisting of polypropylene (PP), ethylene methyl acrylate copolymer (EMA), polyethylene (PE), styrene acrylonitrile (SAN), thermoplastic polyurethane (TPU), acrylonitrile butadiene styrene (ABS), polystyrene (PS), polycarbonate (PC), polyvinylchloride (PVC), polyoxymethylene (POM), nylon, polyacrylic, polyester, methyl methacrylate-acrylonitrile-butadiene-styrene (MABS), and a combination thereof.

10. The method according to claim 9, wherein the organic acid comprises benzoic acid.

11. The method according to claim 10, wherein 3-phenylpropanol is present in the composition.

12. The method according to claim 11, wherein benzoic acid and 3-phenylpropanol are present in the composition at a ratio of 2:1 to 1:2 relative to one another.

13. The method according to claim 8, wherein the compounded material is in a form of a masterbatch.

14. The method according to claim 13, further comprising using the masterbatch to produce an article having prolonged and/or permanent antimicrobial effect.

\* \* \* \* \*